(12) United States Patent
Wang et al.

(10) Patent No.: US 9,506,792 B2
(45) Date of Patent: Nov. 29, 2016

(54) CORIOLIS MASS FLOWMETER

(71) Applicant: Krohne AG, Basel (CH)

(72) Inventors: Tao Wang, Canterbury (GB);
Christopher Rolph, Hartwell (GB);
Gary Jones, Kettering (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/753,548

(22) Filed: Jun. 29, 2015

(65) Prior Publication Data
US 2015/0377672 A1    Dec. 31, 2015

(30) Foreign Application Priority Data

Jun. 30, 2014 (DE) .......... 10 2014 109 116

(51) Int. Cl.
*G01F 1/84* (2006.01)
(52) U.S. Cl.
CPC ........... *G01F 1/8472* (2013.01); *G01F 1/8409* (2013.01); *G01F 1/8413* (2013.01); *G01F 1/8477* (2013.01); *G01F 1/8427* (2013.01)
(58) Field of Classification Search
CPC ........................................................ G01F 1/84
USPC ....................................... 73/861.355–861.357
See application file for complete search history.

(56) References Cited

U.S. PATENT DOCUMENTS

| | | | |
|---|---|---|---|
| 4,738,143 A * | 4/1988 | Cage ............... | G01F 1/8409 73/861.355 |
| 4,876,898 A | 10/1989 | Cage et al. | |
| 4,895,031 A * | 1/1990 | Cage ............... | G01F 1/8409 73/861.355 |
| 4,955,239 A * | 9/1990 | Cage ............... | G01F 1/8413 174/117 F |
| 6,662,120 B2 | 12/2003 | Drahm et al. | |
| 6,895,826 B1 | 5/2005 | Nakao et al. | |
| 7,051,598 B2 | 5/2006 | Bitto et al. | |
| 2012/0123705 A1* | 5/2012 | Drahm ........... | G01F 1/8413 702/54 |
| 2014/0137666 A1* | 5/2014 | Werbach .......... | G01F 1/8404 73/861.355 |

FOREIGN PATENT DOCUMENTS

EP          0553939 A2    8/1986

* cited by examiner

*Primary Examiner* — Jewel V Thompson
(74) *Attorney, Agent, or Firm* — David S. Safran

(57) ABSTRACT

A Coriolis mass flowmeter having at least one curved measuring tube having an inlet end, outlet end and a central curved section between the inlet end and outlet end, a carrier bridge extending between the inlet end and outlet end of the measuring tube and fixing the measuring tube ends, at least one oscillation generator attached to the measuring tube, at least one oscillation sensor for detecting measuring tube oscillations, an evaluation unit for evaluating detected measuring tube oscillations, and wherein the measuring tube extends through at least one opening from an inner area of the carrier bridge out of the carrier bridge into the outer area of the carrier bridge, the central curved section running outside of the carrier bridge. A conductor guiding structure is arranged on the carrier bridge extending toward the oscillation sensor and the conductor arrangement fixed on the conductor guiding structure.

12 Claims, 5 Drawing Sheets

CORIOLIS MASS FLOWMETER

BACKGROUND OF THE INVENTION

1. Field of the Invention

The invention relates to a Coriolis mass flowmeter having at least one bent measuring tube, having a carrier bridge extending between the inlet side and outlet side end of the measuring tube and fixing the measuring tube ends, having at least one oscillation generator for exciting the measuring tube to oscillations, having at least one oscillation sensor for recording measuring tube oscillations, having an evaluation unit for evaluating the measuring tube oscillations recorded by the oscillation sensor, and having at least one conductor arrangement for transmitting the recorded measuring tube oscillations to the evaluation unit, wherein the measuring tube has a central curve and the measuring tube extends, at least with its central curve through at least one opening in the carrier bridge from the inner area of the carrier bridge out of the carrier bridge into the outer area of the carrier bridge, and wherein the oscillation sensor is attached to the measuring tube outside of the carrier bridge, namely outside of the closed section that is limited by the carrier bridge and the section of the measuring tube running outside of the carrier bridge.

2. Description of Related Art

Coriolis mass flowmeters are known in a plurality of designs in the prior art. Mass flowmeters that operate using the Coriolis principle usually have at least one oscillation generator, with which the measuring tube is excited to oscillation—or possibly also for exciting several measuring tubes to oscillation—as well as, often, two oscillation sensors, with which the desired oscillation or the desired oscillations of the measuring tube are recorded. The oscillation sensors are usually attached on the inlet and outlet ends of the measuring tube. Without flow, the signals of the two oscillation sensors are essentially in phase. With mass flow, differently directed Coriolis forces result on the inlet and outlet ends, which lead to a phase shift between the deflections and thus between the two signals of the oscillation sensors, wherein the phase shift is proportional to the mass flow within the measuring tube.

The oscillation generator and the oscillation sensors are mostly constructed so that they have a permanent magnet as well as a coil in order to transmit oscillations to the measuring tube electrically or to record oscillations of the measuring tube.

In order to make connection of the Coriolis mass flowmeter to the process easily possible, carrier bridges have an input flange and an output flange, into which the measuring tube is inserted with its ends. The measuring tube is attached in the carrier bridge so that the measuring tube can essentially only be moved into oscillation outside the carrier bridge due to the effected fixation. Node plates are often used in order to exactly specify the oscillation zero point.

From experience, Coriolis mass flowmeters having a bent measuring tube or having several bent measuring tubes, one oscillation generator, two oscillation sensors and a carrier bridge are known to the applicant, in which the oscillation generators are located within the closed area that is limited by the carrier bridge and the section of the measuring tube or measuring tubes running outside the carrier bridge. In Coriolis mass flowmeters known from the prior art, the conductor arrangement, with which the electric measuring signal recorded by the oscillation sensors is transmitted to the evaluation unit, is sometimes guided along the measuring tubes and attached to the measuring tubes. Since the measuring tubes are carriers of the measuring signal in the form of oscillations, it cannot be ruled out that guiding the conductor arrangement along the measuring tube influences measurement, in particular, guiding the conductor arrangement affects the accuracy of the flow measurement as well as the series spread of the measuring device behavior. Among measuring tubes with small cross sections, guiding the conductor arrangement along the measuring tube in the shown manner can have adverse effects, which is naturally not desirable.

SUMMARY OF THE INVENTION

Thus, the object of the invention is to provide a Coriolis mass flowmeter in which the problems involved with contact of the oscillation sensors due to the conductor arrangement are reduced, at least in part.

The above derived object is achieved with a Coriolis mass flowmeter of the type being discussed here in that a conductor guiding structure is arranged on the carrier bridge, the conductor guiding structure extends in the direction of the oscillation sensor and the conductor arrangement is directly guided from the oscillation sensor to the conductor guiding structure and is fixed there.

Consequently, the conductor arrangement has no contact to the measuring tube in the Coriolis mass flowmeter according to the invention, whereby the measuring accuracy is increased, since no additional interference is caused by conductor arrangements that are attached to the measuring tube. If it is said that the conductor guiding structure extends in the direction of the oscillation sensors, this means that the free space between the carrier bridge and the mounting site of the oscillation sensors is reduced by the conductor guiding structure, whereby the length of the non-guided portion of the conductor arrangement is reduced. The undesirable influence of measuring tube oscillation is further reduced by the shorter length of the non-guided portion of the conductor arrangement implemented in this manner.

A further advantage of the invention is the decrease of limitations on the shape of the measuring tube. Sensors in the prior art are, for the most part, mounted within the closed section formed by the carrier bridge and the bent measuring tube. For this reason, the measuring tube can only be bent to a maximum angle before the closed section becomes too small for the arrangement of sensors. If the oscillation sensors are attached outside this area, the required space within the closed area is reduced and the measuring tube can be bent further, which favors a compacter construction of a Coriolis mass flowmeter according to the invention.

One design of the present invention provides that the conductor guiding structure has an arched design and extends essentially perpendicular to the longitudinal direction—i.e., from one end of the measuring tube to the other—of the carrier bridge. The conductor guiding structure can be attached on two areas of the carrier bridge as a separate component due to the arched design and can be positioned over an opening or an open section in the carrier bridge. The arrangement of the conductor guiding structure for guiding the conductor arrangement to an evaluation unit is not limited to an essentially perpendicular direction of the conductor guiding structure, thus it can also extend slanted over the carrier bridge for a more advantageous situation. According to a preferred design, it is provided here that the conductor guiding structure has its base point on the carrier bridge close to the point of passage of the measuring tube through the carrier bridge and is oriented essentially parallel to the course of the measuring tube in its extension in the direction of the oscillation sensors. The base point, then, naturally, also lies outside the closed area that is limited by the carrier bridge and the section of the measuring tube running outside the carrier bridge.

Preferably, the oscillation generator is attached to the measuring tube in the curve of the measuring tube in a further design. Due to a conductor guiding pedestal attached to the carrier bridge, which is located within the closed area formed by the measuring tube and the carrier bridge, the conductor arrangement can be guided from the oscillation generator to the conductor guiding pedestal and fixed in the same manner without the conductor arrangement of the oscillation generator coming into contact with the measuring tube. The oscillation generator can also be attached outside the closed area on the measuring tube.

A further design of the invention provides that the conductor guiding structure has an angled design and extends essentially perpendicular to the longitudinal direction of the carrier bridge. The conductor guiding structure extends over an opening or an open area of the carrier bridge about halfway due to its angled shape and is attached, preferably welded, to an area on the carrier bridge as a separate component. This design favors material savings, since an angled conductor guiding structure requires only about half the material compared to the arched design. The conductor guiding structure can, for example, be formed of metal or another material.

In a particularly simple design, the conductor guiding structure has a straight design and also extends essentially perpendicular to the longitudinal direction of the carrier bridge. Preferably, the conductor guiding structure is then formed of a flat sheet or a straight rod.

The height of the conductor guiding structure is chosen so that the plateau of the arch shape or angle shape of the conductor guiding structure or simply the free end of the conductor guiding structure (in the case of an essentially straight design) is located relatively close to the oscillation sensor. Thus, the free space between the oscillation sensor and the carrier bridge is reduced. In this manner, the free conductor path of the conductor arrangement can be reduced without guiding the conductor arrangement over the measuring tube.

In a further design of the invention, the conductor guiding structure is formed as one piece with the carrier bridge, so that attachment, in particular welding, of the conductor guiding structure is not necessary.

In one design of the invention, the conductor guiding structure can have connection elements so that the conductor arrangement of the oscillation sensors can be directly attached to the conductor guiding structure.

In a further design of the invention, the carrier bridge has a closed cylindrical design that is provided with recesses on the inlet and outlet ends in order to make it possible to guide the bent measuring tube or measuring tubes out of the inner area of the carrier bridge to the outer area of the carrier bridge. Due to the curve of the measuring tube, it returns to the inner area of the carrier bridge through the same opening or a further opening. At the ends of the cylinder, the carrier bridge changes over into flanges, into each of which an end of the measuring tube is led. In the case of several measuring tubes, these measuring tubes are merged together in terms of flow in the flanges or in the area of the flanges. Finally, the cylinder is inserted on the inlet and outlet sides of the process via the flange connection.

In another design of the invention, the carrier bridge has a U shape. It is thereby aligned so that the open side of the U shape is used as the opening for the transition of the measuring tube from the inner area to the outer area. The conductor guiding structure can be attached at the sides of the U bent upward of the carrier bridge, or can be designed as one piece with it.

A further design of the invention provides that the conductor arrangement is designed as a cable connection. A conductor applied on a film board, however, is also possible.

In detail, there is a plurality of possibilities for designing and further developing the Coriolis mass flowmeter according to the invention as will become apparent from the description of embodiments in conjunction with the accompanying drawings.

DETAILED DESCRIPTION OF THE INVENTION

Figure 1:
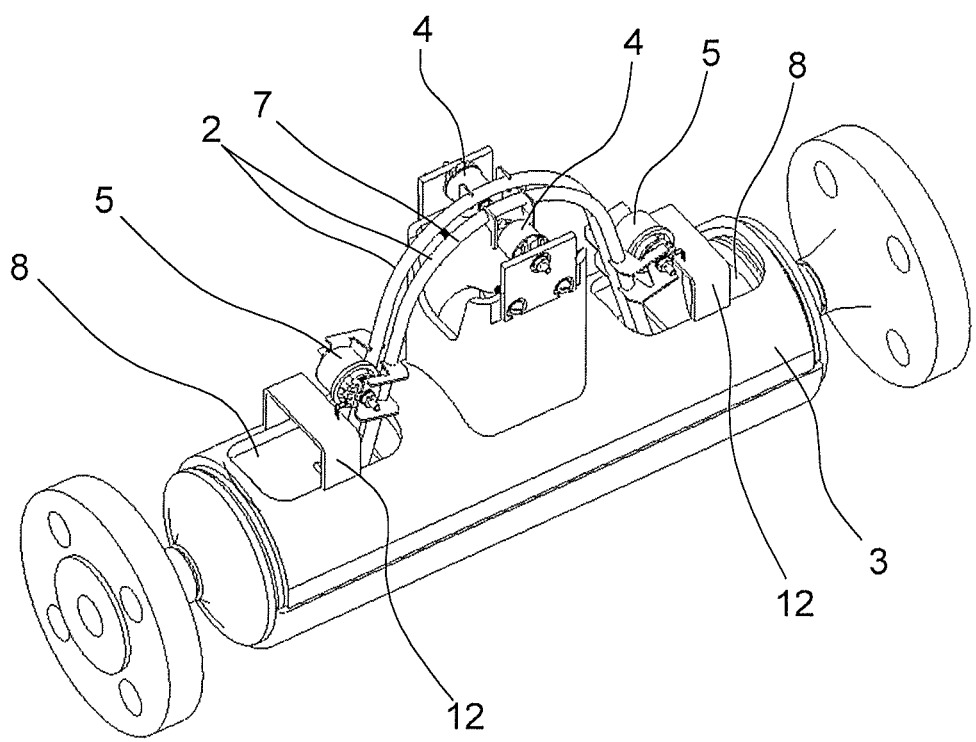
FIG. 1 shows a Coriolis mass flowmeter according to a preferred embodiment of the invention in a perspective view.

A Coriolis mass flowmeter can be seen in FIG. 1 according to a preferred embodiment of the invention, which has two measuring tubes 2 that are excitable to oscillations. The tubes 2 are attached to a carrier bridge 3, which fixes the measuring tube 2 on the inlet and outlet ends. The Coriolis mass flowmeter 1 additionally has an oscillation generator 4 and two oscillation sensors 5. As can be better seen in FIG. 3, conductor arrangements 6 are attached to the oscillation sensors 5, which are used for transmitting the recorded measuring tube signals. The conductor arrangements 6 are shown as a cable connection, however, they can be formed by conductor paths on a film board in other implementations.

The carrier bridge 3 has a cylindrical design in the embodiment shown in FIG. 1. However, it is possible that the carrier bridge 3 takes the shape of a U with the open side up, or a conceivably similar shape. The carrier bridge 3 is thereby used for stabilization and fixing of the measuring tubes 2 at their ends. The measuring tubes 2 thereby have a central curve 7 so that, on the outlet end, they exit through an opening 8 in the carrier bridge and, on the inlet end, they return into the carrier bridge 3 through a further opening 8. In such a carrier bridge 3 having a U shape with the open side up, such an opening 8 is extends over the entire length being formed by the upward-facing open side.

Figure 2:
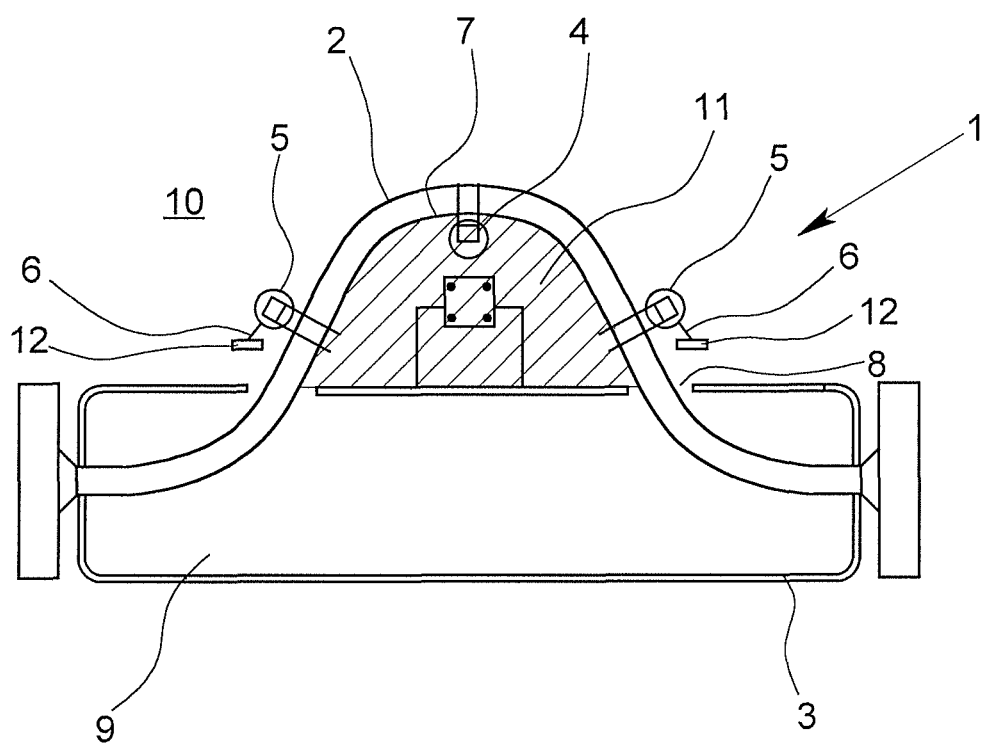
FIG. 2 shows Coriolis mass flowmeter according to a preferred embodiment of the invention in cross section.

FIG. 2 shows a representation of a Coriolis mass flowmeter 1 according to the invention in cross section. This illustrates that different areas are defined by the design of the carrier bridge 3. On the one hand, the inner area 9 of the carrier bridge 3 and, on the other hand, an outer area 10 of the carrier bridge 3 can be seen. The measuring tubes 2 run from the inner area 9 of the carrier bridge 3 over the outer area 10 and, due to the central curve 7, back into the inner area 9 of the carrier bridge. Furthermore, a closed area 11 results from the arrangement of carrier bridge 3 and measuring tubes 2, which is limited by the carrier bridge 3 and the bent measuring tubes 2, wherein, in a top view of the level, the closed area 11 results, in which the measuring tubes 2 essentially run.

Figure 3:
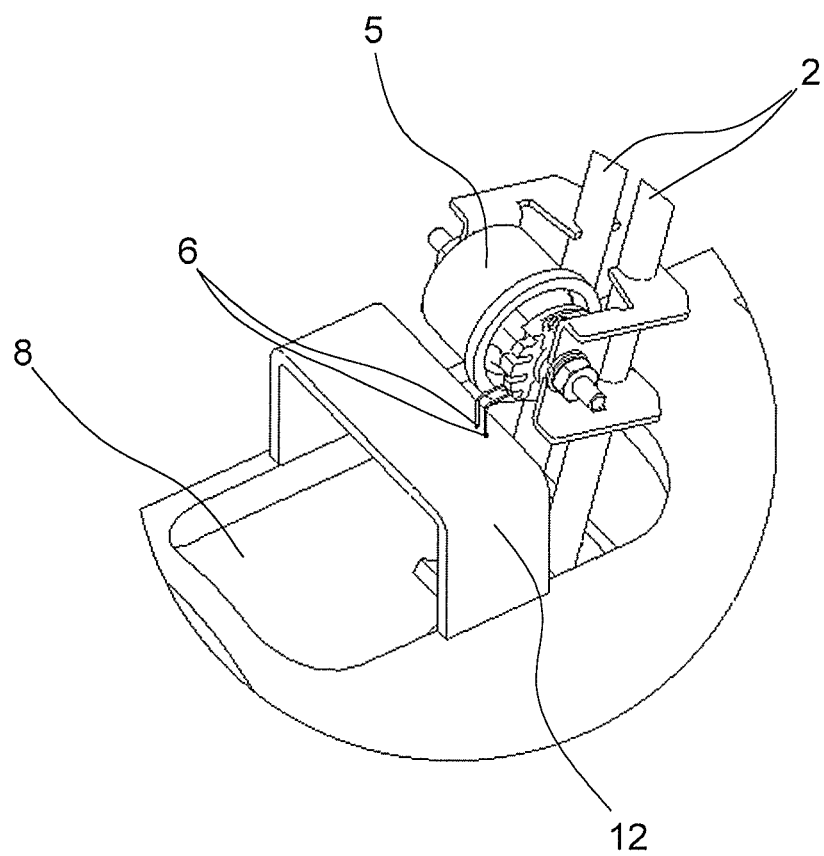
FIG. 3 is an exploded representation of part of the Coriolis mass flowmeter according to FIG. 1 in a perspective view.

FIG. 3 shows an exploded view of a part of the Coriolis mass flowmeter according to FIG. 1. The oscillation sensors 5 are attached to the measuring tubes 2 in the outer area 10 of the carrier bridge 3 and outside the closed area 11. A conductor guiding structure 12 is arranged on the carrier bridge 3 so that the conductor guiding structure 12 extends in the direction of the oscillation sensors 5. A holder for the conductor arrangement 6 of the oscillation sensors 5 is created by the conductor guiding structure 12, which is located in close range to the oscillation sensors 5 in electric contact with the conductor arrangement 6. The conductor arrangement can be guided fixed directly to the conductor guiding structure 12, and from there, can be further guided without the conductor arrangement 6 coming into contact with the measuring tubes 2. Interferences from the conductor arrangement 6 on the oscillating measuring tubes are thereby minimized, which would otherwise arise due to the attachment of the conductor arrangement 6 on the measuring tubes 2.

The embodiment according to FIG. 3 shows an arched design of the conductor guiding structure 12. This is positioned over the opening 8 of the carrier bridge 3 and attached to two areas at the edge of the opening 8. In the shown case, the carrier bridge 3 and the conductor guiding structure 12 consist of metal and are welded to one another. However, it is also possible that the conductor guiding structure 12 is formed as one piece with the carrier bridge 3. The height of the arched conductor guiding structure 12 is chosen so that the plateau of the arch is in close proximity to the oscillation sensors 5 in order to implement short as possible open paths of the conductor arrangement 6 from the oscillation sensors 5 to the conductor guiding structure 12. Connecting elements are designed on the conductor guiding structure 12, which is made of metal, so that the conductor arrangement 6 is directly connected to the conductor guiding structure 12.

Figure 4:
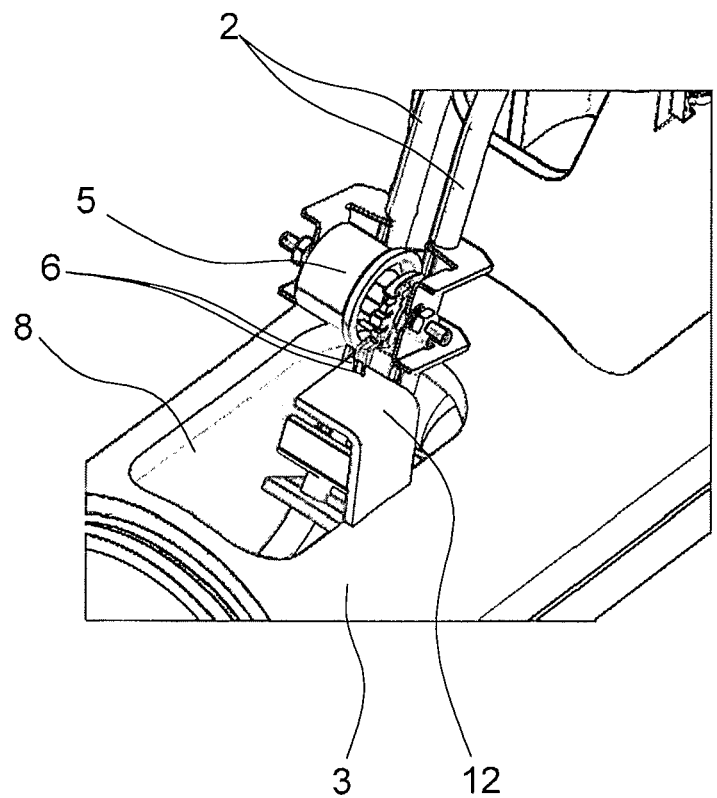
FIG. 4 is an exploded representation of part of the Coriolis mass flowmeter according to a further preferred embodiment of the invention in a perspective view.

FIG. 4 shows a further embodiment of the Coriolis mass flowmeter 1 according to the invention. The conductor guiding structure 12 is not arched, but has an angled shape. Thus, it is not attached to an area on the carrier bridge 3. In an unillustrated embodiment, the conductor guiding structure is formed as one piece with the carrier bridge 3. The conductor guiding structure 12 according to FIG. 3 only reaches about half way to the opening 8 of the carrier bridge 3, but far enough that the conductor arrangement 6 is still easily connected to the conductor guiding structure 12 at a minimum distance. The conductor guiding structure 12 is aligned approximately perpendicular to the direction of extension of the carrier bridge 3.

Figure 5:
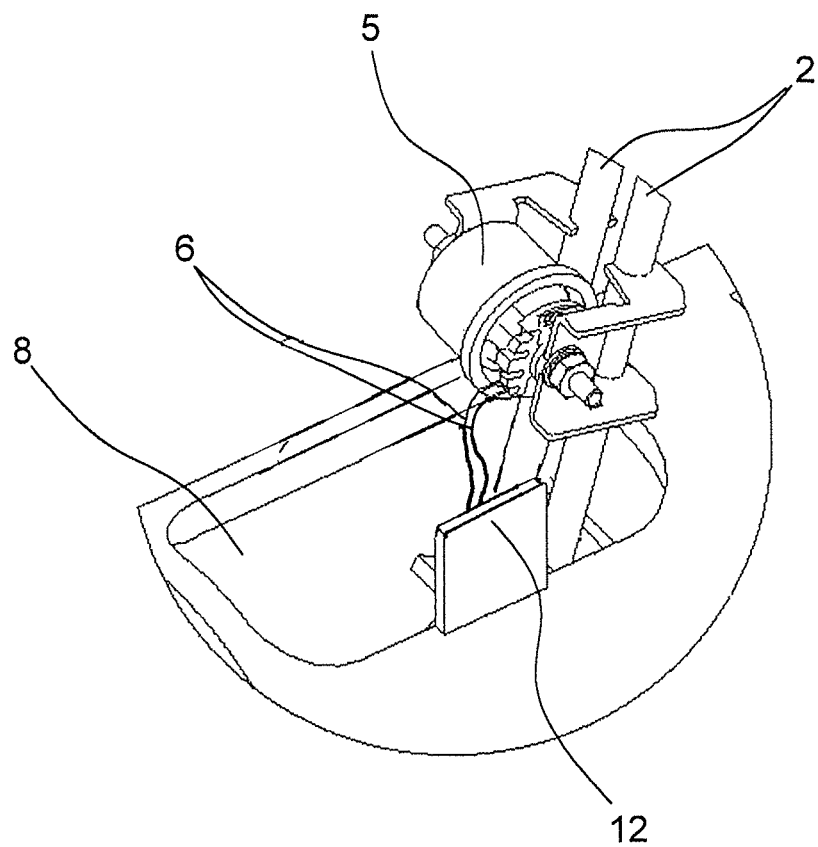
FIG. 5 is a view similar to that of FIG. 3, but of another embodiment of the invention.

FIG. 5 shows another embodiment of the Coriolis mass flowmeter 1 according to the invention in which the conductor guiding structure 12 has a straight shape and extends essentially perpendicular to the longitudinal axis of the carrier bridge 3 within the outer area of the carrier bridge, the conductor guiding structure. Preferably, the conductor guiding structure 12 is then formed of a flat sheet or a straight rod. The height of the conductor guiding structure 12 is chosen so that the free end of the straight conductor guiding structure 12 is located relatively close to the oscillation sensor. Thus, the free space between the oscillation sensor and the carrier bridge 3 is reduced. In this manner, the free conductor path of the conductor arrangement can be reduced without guiding the conductor arrangement over the measuring tube.

What is claimed is:

1. A Coriolis mass flowmeter, comprising:
   at least one curved measuring tube having an inlet end, outlet end and a central curved section between the inlet end and outlet end,
   a carrier bridge extending between the inlet end and outlet end of the measuring tube and fixing the measuring tube ends,
   at least one oscillation generator for exciting the measuring tube to oscillations,
   at least one oscillation sensor for detecting measuring tube oscillations mounted on the measuring tube,
   an evaluation unit for evaluating the measuring tube oscillations detected by the oscillation sensor, and
   at least one conductor arrangement for transmitting the detected measuring tube oscillations to the evaluation unit,
   wherein the measuring tube extends through at least one opening in the carrier bridge from an inner area of the carrier bridge, out of the carrier bridge into an outer area of the carrier bridge, wherein the oscillation sensor is attached to the measuring tube outside of the carrier bridge and wherein the central curved section of the measuring tube runs outside of the carrier bridge,
   wherein a conductor guiding structure is arranged directly on the carrier bridge, the conductor guiding structure extending in a direction from the carrier bridge toward the oscillation sensor and wherein the conductor arrangement is guided directly to the conductor guiding structure from the oscillation sensor and is fixed on the conductor guiding structure.

2. The Coriolis mass flowmeter according to claim 1, wherein the conductor guiding structure has an arched configuration and extends essentially perpendicular to a longitudinal axis of the carrier bridge within the outer area of the carrier bridge, end of the arched configuration being attached to the carrier bridge.

3. The Coriolis mass flowmeter according to claim 1, wherein the conductor guiding structure has an angled design and extends essentially perpendicular to a longitudinal axis of the carrier bridge within the outer area of the carrier bridge in the vicinity of the at least one opening through which the measuring tube extends.

4. The Coriolis mass flowmeter according to claim 1, wherein the conductor guiding structure has a straight shape and extends essentially perpendicular to the longitudinal axis of the carrier bridge within the outer area of the carrier bridge in the vicinity of the at least one opening through which the measuring tube extends.

5. The Coriolis flowmeter according to claim 2, wherein the conductor guiding structure has a height such that a plateau of the arch shape of the conductor guiding structure is located relatively close to the oscillation sensor.

6. The Coriolis mass flowmeter according to claim 1, wherein the conductor guiding structure is made of metal.

7. The Coriolis mass flowmeter according to claim 1, wherein the conductor guiding structure has connection elements for connection of the conductor arrangement of the oscillation sensor.

8. The Coriolis mass flowmeter according to claim 1, wherein the conductor guiding structure is formed in one piece with the carrier bridge.

9. The Coriolis mass flowmeter according to claim 1, wherein the conductor guiding structure is a separate component that is attached to the carrier bridge.

10. The Coriolis mass flowmeter according to claim 1, wherein the carrier bridge has a cylindrical design and a transition from the outer area of the carrier bridge to the inner area of the carrier bridge is implemented by recesses in the carrier bridge.

11. The Coriolis mass flowmeter according to claim 1, wherein the carrier bridge has a U-shape and a transition from the outer area of the carrier bridge to the inner area of the carrier bridge is implemented by the open side of the U-shape.

12. The Coriolis mass flowmeter according to claim 1, wherein the conductor arrangement is a cable connection.

* * * * *